Sept. 15, 1953 R. M. M. OBERMAN 2,652,446

RELEASE SIGNAL FOR TELEGRAPH SYSTEMS

Filed July 30, 1947 4 Sheets-Sheet 1

INVENTOR.
ROELOF MAARTEN MARIE OBERMAN
BY
[signature]
agt

INVENTOR.
Roelof Maarten Marie Oberman
BY
Michael S. Striker
Agent

INVENTOR.
ROELOF MAARTEN MARIE OBERMAN
BY

Sept. 15, 1953 R. M. M. OBERMAN 2,652,446

RELEASE SIGNAL FOR TELEGRAPH SYSTEMS

Filed July 30, 1947 4 Sheets-Sheet 4

INVENTOR.
ROELOF MAARTEN MARIE OBERMAN
BY
[signature] agt

Patented Sept. 15, 1953

2,652,446

UNITED STATES PATENT OFFICE 2,652,446

RELEASE SIGNAL FOR TELEGRAPH SYSTEMS

Roelof M. M. Oberman, The Hague, Netherlands

Application July 30, 1947, Serial No. 767,523
In the Netherlands April 29, 1944

Section 1, Public Law 690, August 8, 1946
Patent expires April 29, 1964

9 Claims. (Cl. 178—4.1)

The present invention relates to telegraph systems, and more particularly to printing telegraph systems.

It is an object of the present invention to provide a telegraph system incorporating novel means for effecting the interruption of a connection by any one of the subscribers concerned.

The present invention relates more particularly to systems working in a so-called five-unit code in which a signal consists of a start element transmitted as marking current, or five-signal elements, which may be either markings or spacings, and of a start element transmitted as a spacing.

It is another object of the present invention to interrupt a connection between stations at a sharply defined moment determined by the duration of the disconnecting signal being a prolonged line interuption of a long marking impulse.

It is a further object of the present invention to provide disconnecting means for a telegraph system using teleprinters in which no undesired signals are printed by the teleprinters.

A telegraph system according to the present invention comprises in its broadest aspect an exchange including a battery having a first terminal and a second terminal, a first subscriber including a first line, a second subscriber including a second line, means for connecting the first subscriber to the exchange, the means for connecting the first subscriber to the exchange including means for connecting the first line to the first and second terminals of the battery so as to cause a current to flow through the first line in a predetermined direction, means for connecting the second subscriber to the exchange, the means for connecting the second subscriber to the exchange being operated by a signal transmited by the first subscriber and including means for connecting the second line to the first and second terminals of the battery so as to cause a current to flow through the second line in a predetermined direction, a repeater in the exchange, the repeater being connected by the connecting means of the subscribers to the lines of the subscribers so as to reproduce signals transmitted by any one of the subscribers to the other of the subscribers, means in one of the subscribers for reversing the direction of the current flowing in the line of the one subscriber, a time delay circuit connected to the repeater, the time delay circuit operating at a predetermined time after the actuation of the current reversing means in the one of the subscribers, and means actuated by the operation of the time delay circuit for disconnecting the other subscriber from the exchange.

Preferably a disconecting key is provided in one of the subscribers and a slowly releasing relay having a winding operated by the disconnecting key, means actuated by the slowly releasing relay reversing the current direction in the line of the subscriber.

Preferably two time delay circuits are connected to the repeater and two supervisory relays are operated, respectively, by the operation of the time delay circuits, means being actuated by the operation of the supervisory relay for disconnecting the subscribers from the exchange.

One embodiment of the printing telegraph system according to the present invention comprises an exchange including a battery having a first terminal and a second terminal, a first subscriber including a first local voltage source, a first receiving magnet, a first printer motor, and a first line, a second subscriber including a second local voltage source, a second receiving magnet, a second printer motor, and a second line, means for connecting the first subscriber to the exchange the means for connecting the first subscriber to the exchange including means for connecting the first line to the first and second terminals of the battery so as to cause a current to flow through the first line in a predetermined direction, a first starting relay in the first subscriber, the first starting relay being operated by the flow of curent through the first line in the predetermined direction, a first switching relay operated by the first starting relay and connecting the first receiving magnet to the first line and the first printer motor to the first local voltage source, means for connecting the second subscriber to the exchange, the means for connecting the second subscriber to the exchange being operated by the signal transmitted by the first subscriber and including means for connecting the second line to the first and second terminals of the battery so as to cause the current to flow through the second line in a predetermined direction, a repeater in the exchange, the repeater being connected by the connecting means of the subscribers to the lines of the subscribers so as to reproduce signals transmitted by any one of the subscribers to the other of the subscribers, the repeater including a first polarized relay having a first line coil connected to the first line, and a second polarized relay having a second line coil connected to the second line, a first armature actuated by the first polarized relay so as to alternate between a first position and a second position, a second armature actuated by the second polarized relay so as to alternate between a first position and a second position, the armatures in the first positions thereof being in contact with the second terminal of the battery, the armatures in the second positions thereof being in contact with the first terminal of the battery, a first time delay circuit connected to the second armature, a second time delay circuit connected to the first armature, the time delay circuits operating at a predetermined time after the armatures, respectively, have been moved from the first position thereof to the second position thereof, a first supervisory relay operated by the operation of the first time delay circuit, a second supervisory relay operated by the operation of the second time delay circuit, a disconnecting key in the first subscriber, a first slowly releasing relay in the first subscriber, the first slowly releasing relay having a winding operated by the disconnecting key and a plurality of contacts, part of the contacts of the first slowly releasing relay disconnecting the first receiving magnet from the first line and connecting the same to the first local voltage source so as to energize the first receiving magnet uninterruptedly, part of the contacts of the first slowly releasing relay coupling the receiver shaft of the first subscriber to the first printer motor so as to start revolving, a printing being prevented by the uninterrupted energization of the first receiving coils, the first switching relay being de-energized by the operation of the first time delay circuit, a second starting relay in the second subscriber, the second starting relay being operated by the flow of current through the second line in the predetermined direction, a second switching relay operated by the second starting relay and connecting the second receiving magnet to the second line and the second printer motor to the second local voltage source, and a second slowly releasing relay in the second subscriber, the second slowly releasing relay being operated by the second time delay circuit and having contacts disconnecting the second receiving magnet from the second line and connecting the same to the second local voltage source so as to energize the second receiving magnet uninterruptedly and coupling the receiver shaft of the second subscriber to the second printer motor so as to start revolving a printing being prevented by the uninterrupted energization of the second receiving coils.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1A:
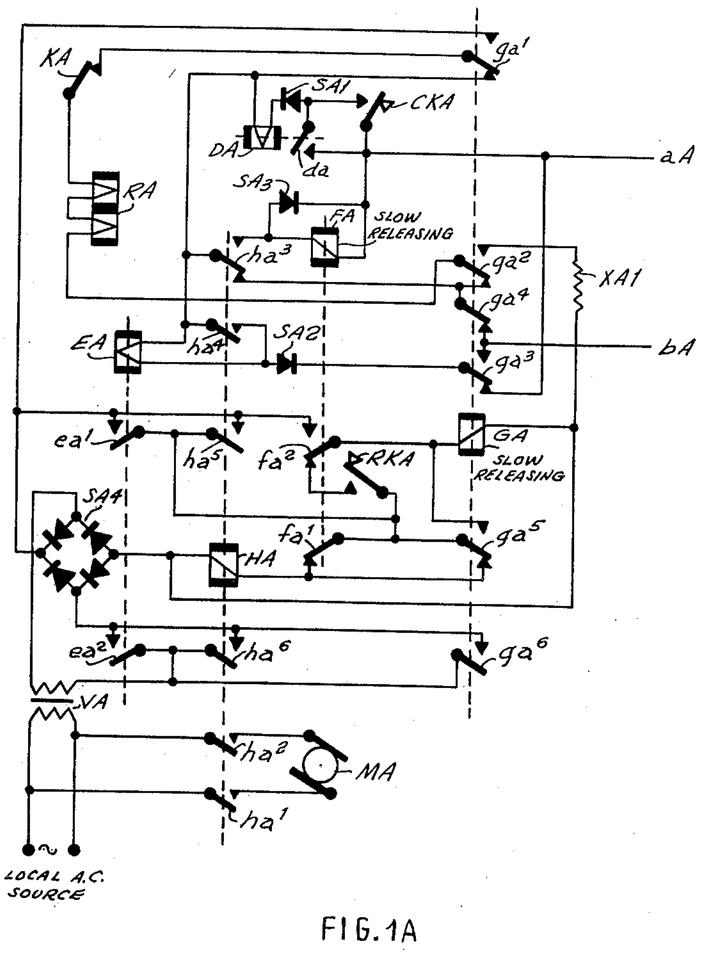
Fig. 1A shows the circuit according to the invention of a calling or first subscriber.
Figure 1B:
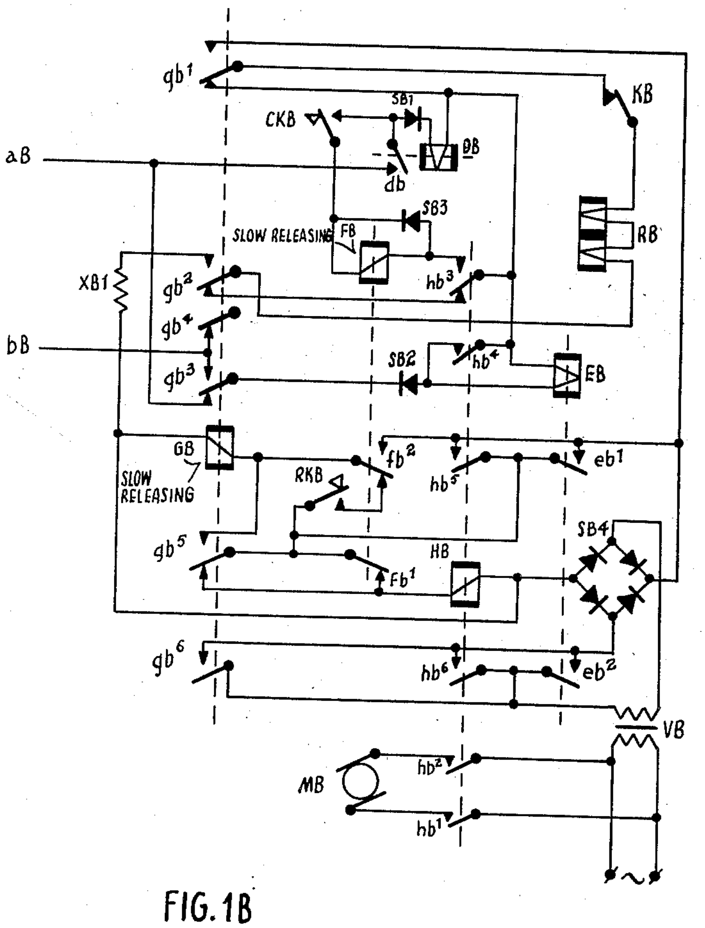
Fig. 1B shows the circuit of a second subscriber B, which is to be called by said subscriber A.

The circuits according to Figs. 1A and 1B are identical and differentiate from each other by the subscripts A and B.

Figure 2:
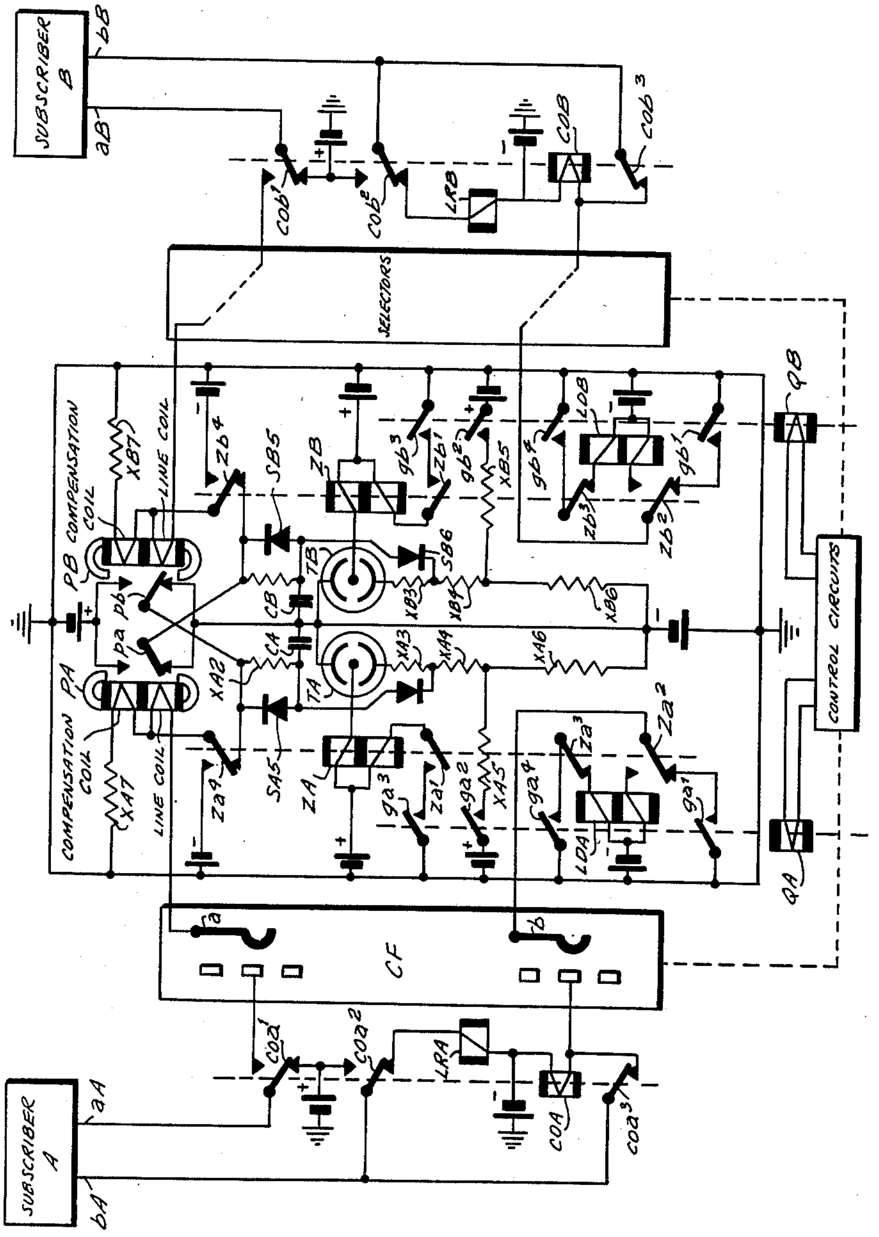

Fig. 2 shows those circuits of an automatic exchange, which are essential for the present invention, these circuits comprising a telegraph repeater and line- and cut-off relays belonging to the subscribers A and B.

Figure 3:
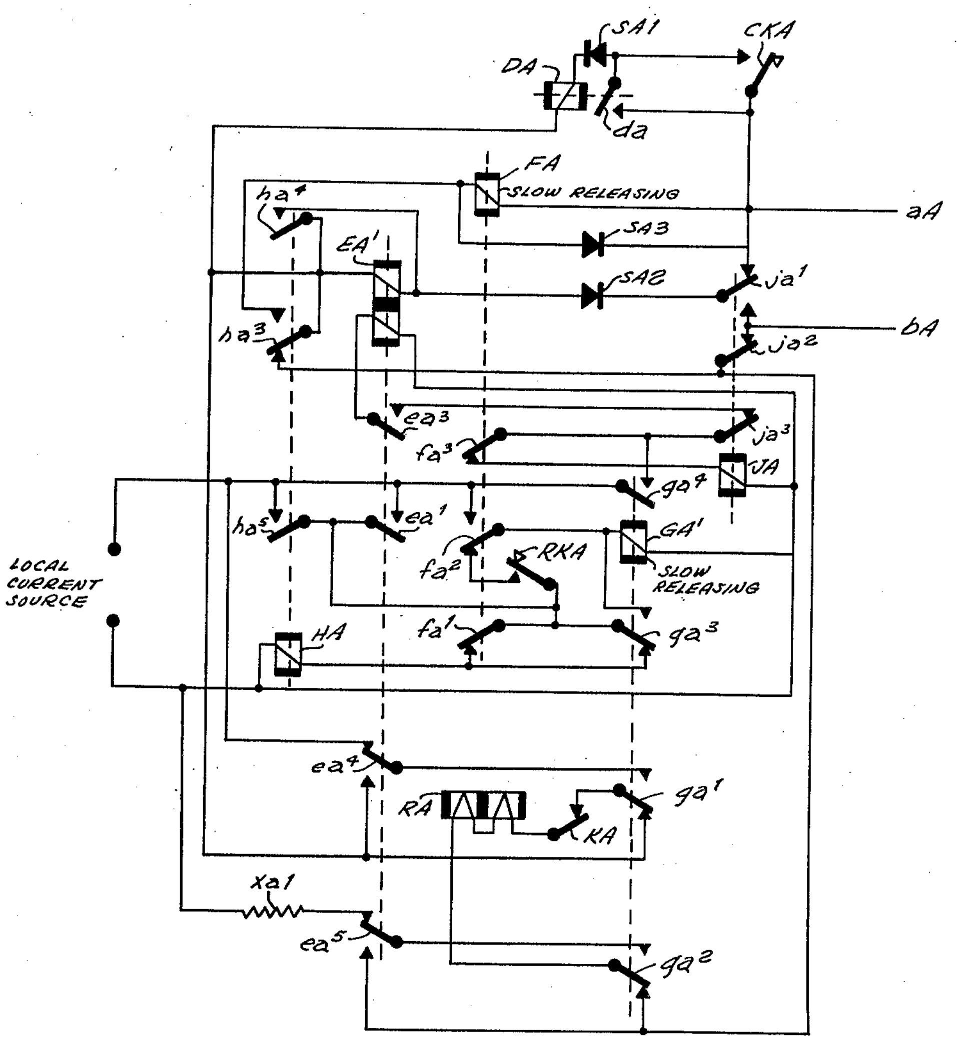

Fig. 3 shows an improvement to the circuit shown in Fig. 1.

When the calling subscriber A wishes to be in connection with a called subscriber B, the following operations are performed:

The first or calling subscriber A (Fig. 1) effects a call by pressing the calling key CKA of his set. In consequence thereof a circuit is closed beginning in the exchange (Fig. 2) at the positive terminal of a battery, continuing via contact *coa*1, wire *a*A, further (in Fig. 1) via key CKA, rectifier SA1, relay DA, contacts *ha*3, and *ga*4, leading back again to the exchange over wire *b*A, ending (Fig. 2) via contacts *coa*2 and *coa*3, relays LRA and COA at the negative terminal of battery. Relay DA (Fig. 1) locks itself via front contact *da* shunting the key CKA. The current in this circuit flows partly through the windings of relay COA which, however, has such a high resistance that it does not operate. In the exchange the line relay LRA signals the call in a known manner (which is not shown) when a manual system is used, whereas in an automatic system a preselector or line finder CF, as shown in Fig. 2, is started for busying a free connecting circuit, and in the case of an indirect system also a cord finder, for seizing a free register. After the connecting circuit has been established a line busying relay QA operated by a wiper (not shown) of the line finder CF, connects the cut-off relay COA (Fig. 2) to full voltage by means of contact *qa*1 of relay QA in a circuit leading from ground via contacts *qa*1 and *za*2, wiper *b* of line finder CF, relay COA, to the negative terminal of battery. Thus contacts *coa*1 and *coa*2 reverse the current direction in the line of calling subscriber A, termed heerinafter the first line, rendering rectifier SA2 (Fig. 1A) conductive and operating a starting relay EA (termed hereinafter the first starting relay) via wire *b*A, contacts *ga*4, *ha*3, winding of relay EA, the current flowing back to the exchange via rectifier SA2, contact *ga*3 and wire *a*A. Thus contact *ea*2 supplies current of a first local A. C. source over a transformer VA to the input of a bridge rectifier SA4 and contact *ea*1 closes the output circuit of bridge rectifier SA4 which, via contacts *fa*1 or *ga*5, operates a first switching relay HA shown in Fig. 1. Relay DA (Fig. 1) is de-energized because rectifier SA1 is non-conductive owing to the current reversion. A motor MA (termed hereinafter the first printer motor), which drives the transmitting and receiving shaft of the teleprinter, is switched on by contacts *ha*1 and *ha*2. Directly after the changing-over of contact *ha*3 normal line current flows via wire *b*A, contacts *ga*4 and *ga*2, teleprinter receiver coils RA, termed hereinafter the first receiving magnet, transmitting key KA, contacts *ga*1 and *ha*4 (the latter short-circuiting relay EA), rectifier SA2, contact *ga*3 and further via wire *a*A back to the central station, where it flows via contact *coa*1, wiper *a* of line-finder CF, line-coil of a first polarized relay PA, contact *za*4, and change-over contact *pb*, to the negative terminal of battery. Front-contact *ha*6 secures the supply of voltage from the first local A. C. source over transformer VA to the bridge rectifier SA4.

The calling subscriber A may now select the desired connection by means of signals emitted by keys of his keyboard. After the desired connection has been established relay QB (Fig. 2) operates (in a manner known per se in the art) so that cut-off relay COB, belonging to the subscriber B to be called, operates in a circuit leading from ground, via contacts *qb*1 and *zb*2, one or more selectors, winding COB to the negative terminal of battery (Fig. 2). Contacts *cob1* and *cob2* now reverse the current direction in the line of the called subscriber B termed hereinafter the second line so that a second starting relay EB operates in a circuit leading from positive terminal of battery via contact *cob2*, wire *b*B, contacts *gb4* and *hb3*, winding of starting relay EB, rectifier SB2, contact *gb3* back to the exchange via wire *a*B, contact *cob1*, one or more selectors, line coil of a second polarized relay PB, contact *zb4* and armature *pa* to the negative terminal of battery.

In the same manner as the set of subscriber A is brought into working condition by the operation of the first starting relay EA, the set of subscriber B is brought into operation by the second starting relay EB, which need not be described in detail.

A communication between A and B can now be effected, every signal, transmitted by A or B being repeated by the repeater consisting of the polarized relays PA or PB, shown in Fig. 2, respectively.

With spacing current the flux which makes the first and second armatures *pa* and *pb* remain in the position shown in Fig. 2 is the result of two currents, flowing through each polarized relay; a current +I, flowing from the positive terminal of battery via the subscriber and the line coil, and a current with a value of about −½I, flowing from ground via the compensation resistance (XA7 or XB7) through the compensation coil (in reversed sense with respect to the former current), both said currents ending via the armature of the opposite repeater relay, at the negative terminal of battery. Thus the resulting current through the coils of the polarized relays is equal to ½I. When A transmits a marking by interrupting the line-current (by means of transmission key KA), the current in the polarized relay PA is −½I so that armature *pa* changes the position thereof. In consequence thereof the current in the compensation-coil of repeater relay PB is reversed, whereas no current flows through the line-coil of that relay as both ends of the line to B are connected to the positive terminal of battery. The resulting current through repeater relay PB is +½I, so that armature *pb* remains in spacing position. Connecting both ends of the line to B to the positive terminal of battery causes a marking-current in that line, operating B's teleprinter.

An existing connection is broken by pressing one of the disconnecting keys RKA or RKB at the subscriber's stations. When, by way of example, subscriber A presses his key RKA, an operative circuit is established for the first slowly releasing GA, said circuit leading from bridge rectifier SA4 via contact *ha5*, disconnecting key RKA and contact *fa2* to the winding of relay GA and from there back to bridge rectifier SA4. The slowly relesing relay GA holds itself by means of contact *ga5*. Contacts *ga1* and *ga2* switch over the first receiving magnet RA from the line to the first local current A. C. source, so that the receiver shaft of teleprinter A is coupled to the driving motor and starts revolving. Printing of a letter will be prevented by the subsequent uninterrupted energization of the receiver magnet RA, representing in the usual five-unit code a signal consisting of five spacings preceded by a marking as start element which is the signal changing from "figure" to "letter-" receiving condition. Contacts *ga3* and *ga4* alter the circuit in such a way, that flowing of normal line-current is prevented, the circuit leading from the positive terminal of battery via wire *b*A, contact *ga3*, rectifier SA2, contact *ha4* and *ha3*, rectifier SA3 and wire *a*A back to the exchange. Contact *ga4* disconnects wire *b*A, which is desirable at this stage in view of disturbances.

Furthermore a disconnection of the station of subscriber A can be caused by reversing the line-current in the exchange.

The situation as described represents the transmission of marking current by A.

As a result thereof a signalling device is actuated as described in U. S. patent application, Serial No. 767,521, filed July 30, 1947, now U. S. Patent 2,606,251 dated August 5, 1952.

Signalling devices as mentioned above are applied to subscriber A as well as to subscriber B. Both devices are shown in Fig. 2 near the telegraph repeater.

Assuming that A presses his disconnecting key RKA, the resulting operation of the signalling device belonging to subscriber B will now be described. It will be obvious, however, that in a similar way the signalling device belonging to subscriber A operates, if subscriber B presses his disconnecting key RBK.

Each time when the armature *pa* is in contact with the positive terminal of battery a condenser CB is charged via a resistor XB2. The voltage of the condenser CB is connected via a rectifier SB6 and a resistor XB3 to the control grid of a gas filled tube TB. The condenser CB, the resistor XB2 and the tube TB3 form a second time delay circuit connected to the first armature *pa* and operating at a predetermined time after reversing the current direction in the line of the subscriber A. A second voltage supplied by a potentiometer XB5, 6 in combination with batteries and with contact *qb2* also controls, via resistor XB4, the potential of the control grid of the tube TB, in order to prevent undesired ignition thereof. As soon as the armature *pa* is returned so as to be in contact with the negative terminal of battery, the condenser CB is quickly discharged via rectifier SB5, thus preventing an ignition of tube TB. The signalling device is adjusted in such a way that only a signal consisting of marking current of a length of at least 110 milliseconds (i. e. the disconnecting condition effected by subscriber A) will enable the tube TB to fire so that a second signalling or supervisory relay ZB is operated in a circuit leading from positive terminal of battery, via the operating winding of relay ZB and tube TB to the negative battery terminal. Contact *zb1* thereupon closes a holding circuit for supervisory relay ZB, while contact *zb4* is switched-over to negative battery terminal supplying spacing current. This prevents the teleprinter of station B from printing undesired signals. At the same time contact *zb3* interrupts the circuit, which operated relay LDB by the operating winding thereof during the seizing of the connection, while change-over-contact *zb2* connects the other winding of relay LBD in series with cut-off relay COB in a circuit which leads from negative battery terminal via the other winding of relay LDB, contact *zb2*, one or more selector stages and winding of relay COB back to minus battery. Therefore both relays LDB and COB are de-energized, the latter causing reversion of the line current of station B by means of the contacts *cob1* and *cob2*. Owing to the blocking action of rectifiers SB2 and SB3 release relay FB at the called subscriber's station is energized in a circuit leading from positive battery terminal via contact cob1, wire aB, winding of release relay FB, contact hb3, transmitting contact KB, second receiver coils RB, contacts gb2 and gb4, leading back to the exchange via wire bB, ending via contacts cob2 and cob3 and windings of shunted relays LRB, COB and LDB at negative battery terminal. The respective resistances of said shunted relays have such values, that the relays remain de-energized at this stage of the release. Change-over-contact fb2 operates a second slowly releasing relay GB. Contacts fb1 and gb5 interrupt the circuit energizing a second switching relay HB. Contacts gb3 and gb4 and restored armature hb3 prevent the flowing of the line current and de-energizes the slowly releasing relay FB. Contact fb2 de-energizes relay GB. Contacts gb1 and gb2 connect the receiver coils RB in series with transmission key KB to the local current source in order to prevent the teleprinter from printing undesired characters. Relay GB releases so slowly that the normal position thereof is restored only after the second motor MB has completely stopped, the teleprinter being unable to continue working. The release of the station of subscriber B is now completed.

After the reversion of the line current in station B, front-contact cob1 is disconnected so that polarized relay PB is energized by a current equal to −½I in a circuit leading from ground via resistor XB7, compensation coil of relay PB, front-contact zb4 to negative battery terminal (Fig. 2). Thus armature pb is brought to contact with positive battery terminal. The signalling device belonging to the station A operates the first supervisory relay ZA after a time interval of about 110 milliseconds in a manner described hereinabove for the corresponding device belonging to the station B. Supervisory relay ZA holds itself by means of contact za1, while contacts za2 and za3 de-energize relays LDA and COA. The relay LDA controls the releasing of the connection between stations A and B within the exchange, while the de-energization of the relay COA results in reversion of the line current of station A by means of the back-contacts coa1 and coa2.

At the station of subscriber A release relay FA is operated in a circuit leading from positive battery terminal via wire aA, relay FA, front-contact ha3, contact ha4, rectifier SA2, and front contact ga3 back to the exchange via wire bA, where the circuit ends via the shunt-connected windings of three relays LRA, COA, and LDA at negative battery terminal. The three relays LRA, COA and LDA are prevented by the shunting thereof from operating.

The final disconnection of the teleprinter circuit of subscriber A takes place in the manner which has been described for the corresponding circuit belonging to subscriber B and will not be further explained here.

In both subscriber stations the receiver shafts of the teleprinters remain in the initial position after the release has been completed, for the following reasons:

The signal device is applied as described more in detail hereinabove, which transmits a signal of desired length consisting of a start element followed by five markings. Furthermore contacts ga1, ga2, or gb1, gb2 are switched over which connect the receiver coils RA or RB, respectively, to currents from local sources. Thus, if the disconnection is effected during the switching time, the receiver shaft of the accessory teleprinter is caused to make exactly one revolution without printing.

The subscriber's circuit described hereinbefore and shown in Fig. 1A involves the drawback, that after having pressed the disconnecting key RKA, the subscriber must wait until the very slowly releasing relay GA releases the armature thereof before a new connection can be established by pressing calling key CKA. This fact is due to the contacts ga1, ga2 and ga4, which prevent a flowing of the line current.

The drawback mentioned above is avoided by modifying the subscriber's circuit as shown in Fig. 3.

This circuit enables a subscriber to effect or to receive a call directly after the relays HA and FA have released. It should be noted that the driving motor MA does not stop. The functions of relay GA of Fig. 1A are distributed in Fig. 3 over two relays, called GA′ and JA.

The marking of the improved circuit is substantially equal to that of the circuit shown in Fig. 1A, especially in so far as it concerns the switching in the exchange. Therefore, it will only be described where it differs from the operation of the circuit shown in Fig. 1A.

When subscriber A presses his calling key CKA, the line current, as already explained, is reversed. Relay EA′ operates in a circuit leading from positive battery terminal via wire bA, contacts ja2 and ha3, winding of relay EA′, rectifier SA2 and contact ja1 back to the exchange via wire aA. Relay DA releases as described above and relay HA is energized in a circuit comprising contact ea1, contacts ga3 and fa1 and winding of relay HA. Current is supplied by a local source (not shown) being equal to that shown in Figure 1A. Contacts of relay HA make a circuit which starts the driving motor (not shown) as in Fig. 1A, while receiver coils RA carry normal line current immediately after the contact ha3 has changed the position thereof. Make contact ha5 closes a holding circuit for relay HA. The teleprinter circuit of the called subscriber B is brought into marking condition by a relay corresponding to relay EA′ which is operated by spacing current.

By pressing the disconnecting key RKA subscriber A releases the circuit. Relay GA′ is energized, the circuit comprising contact ha5, key RKA, back-contact fa2 and winding of slow releasing relay GA′. In a manner already described hereinbefore, contacts ga1 and ga2 switch the receiver coils RA to the local current source enabling the receiver shaft of the teleprinter to make one single revolution, so that it stops again in the initial position without causing the typing of characters. Relay JA is operated in a circuit comprising contacts ga4 and fa3 and winding of relay JA. Contact ja1 now connects wire bA to rectifier SA2, which, however, interrupts the line-current since it blocks said current, as a result of which the signalling device acts transmitting the closing signal to subscriber B, thus causing the de-energization of the relay COB (Fig. 2). De-energization of relay COA can be effected now either by means of the signalling device or in a known way by the de-energization of relay QA, the contact qa1 of which interrupts the operating circuit of the relay COA. In the last mentioned case, relay QA is de-energized together with relay QB immediately after relay LDB is de-energized. In the first mentioned case a signal as described is generated by armature pb, which makes contact with positive battery terminal. This way of releasing is slow, for at least a time interval of 120 milliseconds, representing the length of said signal, is required, which in some systems has certain advantages. Release relay FA is operated in a circuit leading from positive battery terminal via contact *coa1*, wire *a*A, winding of relay FA, and contacts *ha3* and *ja4* back to the exchange over wire *b*A ending via contacts *coa2* and *coa3* and windings of relays LRA and COA. At the station A a second circuit for relay GA' is formed by contact *fa2*, whereas relay JA is restored to normal by interrupting the operating circuit thereof at contact *fa3*. At the station B a relay corresponding to relay GA' is operated by a contact corresponding to contact *fa2*, operation of a relay corresponding to relay JA being prevented by a contact corresponding to contact *fa3*. Relay HA and the corresponding relay at station B are de-energized by the opening of contact *fa1* and the corresponding contact at station B, respectively. The further disconnection of a subscriber's circuit is the same for both subscribers and will be described for the circuit belonging to subscriber A only. The teleprinter electromotor is stopped by break contacts (not shown), of relay HA corresponding to contacts *ha1* and *ha2* shown in Fig. 1A. Relay HA opens the circuit thereof at contact *ha5*. Switching over of armature *ha3* causes de-energization of the slowly releasing relay FA. After the release of armature *fa2* relay GA' is de-energized, so that the subscriber's set is completely restored to normal.

If subscriber A effects a call again by pressing the key CKA immediately after relay HA has released the central device will bring the set of subscriber A to operative condition again by reversing the line current. As a result thereof starting relay EA' is operated in a circuit already described with reference to Fig. 1A. Contact *ea3* closes a holding circuit comprising contacts *ga4*, *ja3*, *ea3* and a winding of relay EA', the circuit being fed by the local current source. Contacts *ea4* and *ea5* switch the receiving coils RA back to the line, the current through said coils simultaneously being reversed, whereby the receiver shaft is coupled to the driving shaft thereof making one single revolution, but without causing a print, as the coils RA are subsequently energized.

The polarity of the local direct current source is of no importance as will be clear from the drawings.

When the central station effects a call to a subscriber, which set is considered to have only just been released, regeneration of the circuit takes place in the same manner as described, however without pressing the calling key at the subscriber's station.

As shown in Fig. 2 the windings or relays LRA (LRB) and COA (COB) are connected in parallel, said relays being marginal. This is not necessary, when at the subscriber's station a release relay (FA) is provided, the resistance of which is so high that the line relay (LRA) does not operate in the line circuit when connected in series with the release relay. The tap at wire *b*A including contact *coa3* should be removed in that case, whereas relay COA should be de-energized by interruption of the circuit. The resistance of relay FA (FB) must, however, not be so high, that the armatures of the receiving magnet (coils RA(RB)) are released by the line current which arises in that case.

In systems in which the repeaters provided in the connecting circuit are adaptable to the nature of the line current, the signalling device should be operated in such a way, that only for subscriber lines applying single current the marking current transmitted by said device on said subscriber lines is converted into spacing current after said device has become operative.

It will be understood that each of the elements described above, or two or more together, may also find a useful application in other types of release circuits differing from the types described above.

While I have illustrated and described the invention as embodied in a release circuit for telegraph systems, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; means in one of said subscribers for reversing the direction of the current flowing in said line of said one subscriber; a time delay circuit connected to said repeater, said time delay circuit operating at a predetermined time after the actuation of said current reversing means in said one of said subscribers; and means actuated by the operation of said time delay circuit for disconnecting said other subscriber from said exchange.

2. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; means in one of said subscribers for reversing the direction of the current flowing in said line of said one subscriber; a time delay circuit connected to said repeater, said time delay circuit operating at a predetermined time after the actuation of said current reversing means in said one of said subscribers; a supervisory relay operated by the operation of said time delay circuit; and means actuated by the operation of said supervisory relay for disconnecting said other subscriber from said exchange.

3. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; a disconnecting key in one of said subscribers; a slowly releasing relay in said one of said subscribers, said slowly releasing relay having a winding operated by said disconnecting key; means actuated by said slowly releasing relay in said one of said subscribers for reversing the direction of the current flowing in said line of said one subscriber; a time delay circuit connected to said repeater, said time delay circuit operating at a predetermined time after the actuation of said current reversing means in said one of said subscribers; and means actuated by the operation of said time delay circuit for disconnecting said other subscriber from said exchange.

4. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; a disconnecting key in one of said subscribers; a slowly releasing relay in said one of said subscribers, said slowly releasing relay having a winding operated by said disconnecting key; means actuated by said slowly releasing relay in said one of said subscribers for reversing the direction of the current flowing in said line of said one subscriber; a time delay circuit connected to said repeater, said time delay circuit operating at a predetermined time after the actuation of said current reversing means in said one of said subscribers; a supervisory relay operated by the operation of said time delay circuit; and means actuated by the operation of said supervisory relay for disconnecting said other subscriber from said exchange.

5. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; means in one of said subscribers for reversing the direction of the current flowing in said line of said one subscriber; a first time delay circuit and a second time delay circuit connected to said repeater, said time delay circuits operating at a predetermined time after the actuation of said current reversing means in said one of said subscribers; means actuated by the operation of said first time delay circuit for disconnecting said one subscriber from said exchange; and means actuated by the operation of said second time delay circuit for disconnecting said other subscriber from said exchange.

6. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction;

means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; means in one of said subscribers for reversing the direction of the current flowing in said line of said one subscriber; a first time delay circuit and a second time delay circuit connected to said repeater, said time delay circuits operating at a predetermined time after the actuation of said current reversing means in said one of said subscribers; a first supervisory relay operated by the operation of said first time delay circuit; means actuated by the operation of said first supervisory relay for disconnecting said one subscriber from said exchange; a second supervisory relay operated by the operation of said second time delay circuit; and means actuated by the operation of said second supervisory relay for disconnecting said other subscriber from said exchange.

7. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; a disconnecting key in one of said subscribers; a slowly releasing relay in said one of said subscribers, said slowly releasing relay having a winding operated by said disconnecting key; means actuated by said slowly releasing relay in said one of said subscribers for reversing the direction of the current flowing in said line of said one subscriber; a first time delay circuit and a second time delay circuit connected to said repeater, said time delay circuits operating at a predetermined time after the actuation of said current reversing means in said one of said subscribers; means actuated by the operation of said first time delay circuit for disconnecting said one subscriber from said exchange; and means actuated by the operation of said second time delay circuit for disconnecting said other subscriber from said exchange.

8. A telegraph system, comprising, in combination, an exchange including a battery having a first terminal and a second terminal; a first subscriber including a first line; a second subscriber including a second line; means for connecting said first subscriber to said exchange, said means for connecting said first subscriber to said exchange including means for connecting said first line to said first and second terminals of said battery so as to cause a current to flow through said first line in a predetermined direction; means for connecting said second subscriber to said exchange, said means for connecting said second subscriber to said exchange being operated by a signal transmitted by said first subscriber and including means for connecting said second line to said first and second terminals of said battery so as to cause a current to flow through said second line in a predetermined direction; a repeater in said exchange, said repeater being connected by said connecting means of said subscribers to said lines of said subscribers so as to reproduce signals transmitted by any one of said subscribers to the other of said subscribers; a disconnecting key in one of said subscribers; a slowly releasing relay in said one of said subscribers, said slowly releasing relay having a winding operated by said disconnecting key; means actuated by said slowly releasing relay in said one of said subscribers for reversing the direction of the current flowing in said line of said one subscriber; a first time delay circuit and a second time delay circuit connected to said repeater, said time delay circuits operating at a predetermined time after the actuation of said current reversing means in said one of said subscribers; a first supervisory relay operated by the operation of said first time delay circuit; means actuated by the operation of said first supervisory relay for disconnecting said one subscriber from said exchange; a second supervisory relay operated by the operation of said second time delay circuit; and means actuated by the operation of said second supervisory relay for disconnecting said other subscriber from said exchange.

9. A printing telegraph system, comprising, in combination, an exchange including a battery having a first terminal and a second terminal; a first subscriber including a first local voltage source, a first receiving magnet, a first printer motor, and a first line; a second subscriber including a second local voltage source, a second receiving magnet, a second printer motor, and a second line; means for connecting said first subscriber to said exchange, said means for connecting said first subscriber to said exchange including means for connecting said first line to said first and second terminals of said battery so as to cause a current to flow through said first line in a predetermined direction; a first starting relay in said first subscriber, said first starting relay being operated by the flow of current through said first line in the predetermined direction; a first switching relay operated by said first relay and connecting said first receiving magnet to said first line and said first printer motor to said first local voltage source; means for connecting said second subscriber to said exchange, said means for connecting said second subscriber to said exchange being operated by the signal transmitted by said first subscriber and including means for connecting said second line to said first and second terminals of said battery so as to cause the current to flow through said second line in a predetermined direction; a repeater in said exchange, said repeater being connected by said connecting means of said subscribers to the lines of said subscribers so as to reproduce signals transmitted by any one of said subscribers to the other of said subscribers, said repeater including a first polarized relay having a first line coil connected to said first line, and a second polarized relay having a second line coil connected to said second line; a first armature actuated by said first polarized relay so as to alternate between a first position and a second position; a second armature actuated by said second polarized relay so as to alternate between a first position and a second position, said armatures in the first positions thereof being in contact with said second terminal of said battery, said armatures in the second positions thereof being in contact with said first terminal of said battery; a first time delay circuit connected to said second armature; a second time delay circuit connected to said first armature, said time delay circuits operating at a predetermined time after said armatures, respectively, have been moved from the first position thereof to the second position thereof; a first supervisory relay operated by the operation of said first time delay circuit; a second supervisory relay operated by the operation of said second time delay circuit; a disconnecting key in said first subscriber; a first slowly releasing relay in said first subscriber, said first slowly releasing relay having a winding operated by said disconnecting key and a plurality of contacts; part of said contacts of said first slowly releasing relay disconnecting said first receiving magnet from said first line and connecting the same to said first local voltage source so as to energize said first receiving magnet uninterruptedly, part of said contacts of said first slowly releasing relay coupling the receiver shaft of said first subscriber to said first printer motor so as to start revolving, a printing being prevented by the uninterrupted energization of said first receiving coils, said first switching relay being de-energized by the operation of said first time delay circuit; a second starting relay in said second subscriber, said second starting relay being operated by the flow of current through said second line in the predetermined direction; a second switching relay operated by said second starting relay and connecting said second receiving magnet to said second line and said second printer motor to said second local voltage source; and a second slowly releasing relay in said second subscriber, said second slowly releasing relay being operated by said second time delay circuit and having contacts disconnecting said second receiving magnet from said second line and connecting the same to said second local voltage source so as to energize said second receiving magnet uninterruptedly and coupling the receiver shaft of the second subscriber to said second printer motor so as to start revolving, a printing being prevented by the uninterrupted energization of said second receiving coils.

ROELOF M. M. OBERMAN.

References Cited in the file of this patent

UNITED STATES PATENTS

| Number | Name | Date |
|---|---|---|
| 1,956,670 | Demarest | May 1, 1934 |
| 2,246,952 | Rea | June 24, 1941 |
| 2,490,666 | Blyholder | Dec. 6, 1949 |